United States Patent [19]

Wistreich et al.

[11] 4,220,668
[45] Sep. 2, 1980

[54] METHOD FOR PREPARING SAUSAGE MEATS

[75] Inventors: Hugo E. Wistreich, Chicago, Ill.; Dennis G. Olson, Lincoln, Nebr.

[73] Assignee: B. Heller & Company, Bedford Park, Ill.

[21] Appl. No.: 967,221

[22] Filed: Dec. 7, 1978

Related U.S. Application Data

[63] Continuation-in-part of Ser. No. 806,956, Jun. 15, 1977, abandoned.

[51] Int. Cl.² ............................................. A22C 11/00
[52] U.S. Cl. .................................. 426/266; 426/284; 426/315; 426/646; 426/105
[58] Field of Search ............... 426/105, 135, 265, 266, 426/272, 646, 652, 284, 315

[56] References Cited

U.S. PATENT DOCUMENTS

| | | | |
|---|---|---|---|
| 2,994,085 | 7/1961 | Teich et al. | 426/266 X |
| 3,620,766 | 11/1971 | Wallace | 426/284 |

FOREIGN PATENT DOCUMENTS 715023  8/1965  Canada .................................... 426/266

*Primary Examiner*—Robert A. Yoncoskie
*Attorney, Agent, or Firm*—McDougall, Hersh & Scott

[57] ABSTRACT

The preparation of sausage meats without fermentation to achieve preservation and coagulation wherein the mixed ingredients of the sausage meat are immersed, with or without encasement, in an aqueous bath having a titratable acidity of 1–20%, in which at least 20% of the acidity is in the form of lactic acid while the remainder is selected of edible organic acids and thereafter cooking and/or smoking the treated sausage meat.

9 Claims, No Drawings

METHOD FOR PREPARING SAUSAGE MEATS

This is a continuation-in-part application of our co-pending application Ser. No. 806,956, filed June 15, 1977, now abandoned, and entitled "METHOD FOR PREPARING SAUSAGE MEATS". This invention relates to smoked and unsmoked sausage and method for the preparation of same.

In accordance with current practice, after the mixture of meats and other sausage ingredients have been stuffed into a suitable casing, the encased mixture is subjected to fermentation procedures for the purpose of coagulation, preservation and the development of taste. For this purpose, dextrose or other fermentable sugar is incorporated into the mixture of ingredients, preferably with a bacterial starter culture and fermentation is caused to take place normally at about 100° F. for from 6 to 100 hours. Such fermentation brings about a drop in pH to a level of about 4.3 to 4.8, with a corresponding development of a tangy flavor and coagulation of proteins.

The described fermentation process represents an undesirable factor in the preparation of sausage since it requires additional space, equipment and labor, as well as additional expenditures of energy for maintaining the sausage at the desired temperature and environmental conditions. Aside from the cost factors described above, the starting bacterial culture required to be admixed as an ingredient introduces a higher cost factor as well as a foreign material which requires careful control to achieve consistency both in taste and texture of the final product.

It is an object of this invention to eliminate the need for fermentation as a step in the preparation of sausages, without loss of the characteristics, such as texture, taste and preservation sought to be obtained by the fermentation step.

It has been found, in accordance with the practice of this invention, that the fermentation step can be eliminated in its entirety in the preparation of sausage if the sausage mixture is soaked in a solution of lactic acid or a mixture of lactic acid and other edible organic acids, such as an acetic acid, citric acid, benzoic acid, sorbic acid, malic acid, caproic acid, in which the latter acids also serve as preservatives.

The lactic acid which is employed in a manner to penetrate into the interior of the mass brings about the desired coagulation as well as the development of the desired taste and texture sought to be obtained by fermentation. Thus the sausage emulsion mixture can be processed without encasement in a natural or synthetic casing, as heretofore required for fermentation. However, it is preferred to make use of a casing, such as of beef middles, collagen, fibrous, cellulose, synthetic film forming resin and the like, into which the mixture of meats and material is stuffed before processing. The casing must be permeable to the acids.

Best results are secured when the solution in which the sausage mixture is immersed has a titratable acidity of 2–15% and preferably 4–10% (meaning percent by weight acid). Solutions having a titratable acidity as low as 1% can be used but the time of treatment with the lactic acid solution must be increased materially to achieve the desired results. A solution having a titratable acidity greater than 20% can be used but little benefit is derived by a solution containing more than 20% acidity.

As described, lactic acid can be used alone in the treatment or it can be used in admixture with other edible organic acids such as acetic acid, citric acid, caproic acid, malic acid, benzoic acid, sorbic acid, para-hydroxybenzoic acid and the like, but in any event the amount of lactic acid should represent at leat 20% and preferably at least 40% of the total acidity.

The following examples, in which the ingredients are given in parts by weight, are given by way of illustration, and not by way of limitation of the practice of the invention:

EXAMPLES 1 TO 3

Beef sausage:

| Ingredients | Ex. 1 | Ex. 2 | Ex. 3 |
| --- | --- | --- | --- |
| beef trimmings, 75-85% lean | 100 | | |
| cow meat, 90% lean | | 75 | 60 |
| beef cheek meat | | | 20 |
| beef trimmings, 50% lean | | 25 | 20 |
| other ingredients per 100 parts meat: | | | |
| corn syrup solids | 2 | 2 | 2 |
| salt | 2 | 2 | 2 |
| cure containing sodium nitrate 4%/nitrite 6.25% | .25 | .25 | .25 |
| ground black pepper | .25 | .25 | .25 |
| water | 10 | 10 | 10 |
| sodium erythorbate | .05 | .05 | .05 |

Procedure:

One half of the other ingredients are mixed with 20 pounds of the meat chopped to form a smooth emulsion. The rest of the meat is ground through a ¼ inch plate and then mixed with the emulsion and the rest of the ingredients for at least 3 minutes.

The mixture is stuffed into a fibrous or cellulose casing having a diameter of 60–80 mm. The encased sausage mixture is immersed in an aqueous solution having a total acidity of 5% formed of 3% by weight acetic acid and 2% by weight lactic acid for about 3 hours.

The treated sausage is then hung in a smoke house and heated to 110° F. with the introduction of natural or liquid derived smoke until the product reaches the desired smoke flavor. The smoked meat is then cooked by continuing to heat in the smoke house by raising the temperature in the smoke house 15° F. per hour until the product reaches a temperature of 150°–155° F.

Thereafter the treated product can be rinsed and dried or drying can be carried out at the same time that the product is being smoked and cooked.

In the foregoing examples, the pH of the brine is 3.63; the pH of the meat before treatment was 5.89; and the pH of the meat after treatment was 4.65.

The bacteria count for the meat was made after treatment in Examples 1 to 3 at 9, 15 and 21 day intervals of incubation at 35° C. In each instance, the bacteria count at the time of packaging and after incubation of up to 21 days, was less than 5000 per gram.

EXAMPLE 4

Beef summer sausage:

| | |
| --- | --- |
| beef, 18-22% fat | 100 |
| additional ingredients as in Examples 1 to 3 | 6.5 |
| water | .5 |

Procedure:

Grind beef through ¼ to 3/16 inch plate, mix with other ingredients for at least 3 minutes and then regrind through 1/18 inch plate. Stuff the mixture into a 2 inch casing beef middles, collagen or fibrous material. Immerse in 4% by weight aqueous solution of lactic acid until full penetration is achieved and the pH drops to below 5.2 and preferably to the range of 4.0 to 4.8. Hang the encased mixture on smoke sticks and smoke and cook as in Examples 1 to 3.

EXAMPLE 5

Polish sausage:

| | |
|---|---|
| untreated beef cheeks | 20 |
| beef head meat | 20 |
| beef trim, 55% fat | 10 |
| pork parts | 10 |
| pork trim, 55% fat | 40 |
| bull meat binder | 5 |
| milk solids, not fat | 5 |
| salt | 3 |
| dextrose | 1 |
| seasoning | .75 |
| garlic powder | .1 |
| sodium thorbate | .15 |
| water or ice | 2.5–3.5 |

Procedure:

Grind cheek and head meat by passing twice through 3/32 inch plate. Grind other meats through ¼ to ½ inch plate, and then mix all of the ingredients for 3 to 5 minutes. Regrind through 3/16 inch plate and stuff into 32 mm hog or collagen casing.

Immerse for 4 hours in aqueous solution of 3% by weight lactic acid, 2% by weight acetic acid and 2% sorbic acid. Smoke and cook on the following schedule:

| Time | Dry Bulb | Wet Bulb | Smoke |
|---|---|---|---|
| 30 min. | 130° F. | 0 | Off |
| 60 min. | 145° F. | 110° F. | On |
| 60 min. | 160° F. | 120° F. | On |
| to 148° F. | 170° F. | 130° F. | On (as needed) |
| 10 min. | Steam at 170° F. | | Off |
| 10 min. | Cold Shower | | Off |

Remove the product from the shower and dry at room temperature for 10 to 15 minutes and then cool and store at 35°–45° F.

EXAMPLES 6, 7 and 8

Thuringer:

| Ingredients: | Ex. 6 | Ex. 7 | Ex. 8 |
|---|---|---|---|
| cow meat, 90% lean | 60 | 40 | |
| beef plates, 50% lean | 30 | 30 | 40 |
| pork trimmings, 45% lean | 10 | 10 | 10 |
| beef hearts, 95% lean | 0 | 20 | 20 |
| beef cheeks trimmed, 92% lean | 0 | 0 | 30 |
| other ingredients: | | | |
| salt | 2.5 | 2.5 | 2.5 |
| seasoning | .5 | .5 | .5 |

Procedure:

Grind all of the meat through ¼ inch plate; while mixing add other ingredients. Immerse in aqueous solution of 2% by weight lactic acid and 2% by weight acetic acid for 4 to 6 hours until the solution penetrates all the way through.

Mix again for 2 minutes and stuff into hog bungs.

Smoke in smoke house for 24 hours at 100° F. and 90% relative humidity, and then raise the temperature of the smoke house 10° F. per hour until the temperature of the meat reaches 138° F.

Hot shower at 175° F. for one minute and cold shower for 3 minutes at room temperature and store at 40° F.

It will be understood that changes may be made in the details of formulation amd the conditions of operation without departing from the spirit of the invention, especially as defined in the following claims.

We claim:

1. A method of preparing a non-fermented sausage, comprising the steps of mixing sausage ingredients including sausage meats, treating the mixture by immersion in an aqueous bath having a titratable acidity within the range of 1–20% for a time sufficient to completely penetrate and coagulate meats of said sausage ingredients and to lower the pH of the meat to below 5.2 throughout its cross section, in which at least 20% of the acidity is in the form of lactic acid while any remainder is selected from the group of edible organic acids selected from the group consisting of acetic, citric, benzoic, sorbic malic and caproic, and then cooking the treated sausage meat.

2. The method as claimed in claim 1 in which the titratable acidity of the aqueous bath is within the range of 2–15%.

3. The method as claimed in claim 1 in which the titratable acidity of the aqueous bath is within the range of 4–10%.

4. The method as claimed in claim 1 in which the acidity is made up of at least 40% lactic acid.

5. The method as claimed in claim 1 in which the treatment by immersion in the acidic bath is for a time sufficient to lower the pH of the meat to below 4.8.

6. The method as claimed in claim 1 in which the treatment by immersion in the acidic bath is for a time sufficient to lower the pH of the meat to within the range of 4.0 to 4.8.

7. The method as claimed in claim 1 in which the sausage meats are immersed in the aqueous acidic bath for at least four hours.

8. The method as claimed in claim 1 which includes the step of stuffing the mixed sausage ingredients into a casing prior to treatment by immersion in the aqueous acidic bath.

9. The method as claimed in claim 1 which includes the step of smoking the treated mixed sausage ingredients.

* * * * *